United States Patent
Bertz et al.

(10) Patent No.: US 10,122,634 B1
(45) Date of Patent: Nov. 6, 2018

(54) PROACTIVE RESPONSE TO PREDICTED BEARER LOSS

(71) Applicant: Sprint Spectrum L.P., Overland Park, KS (US)

(72) Inventors: Lyle T. Bertz, Lee's Summit, MO (US); Daniel S. Broyles, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 135 days.

(21) Appl. No.: 15/004,243

(22) Filed: Jan. 22, 2016

(51) Int. Cl.
  *H04L 12/801* (2013.01)
  *H04L 12/863* (2013.01)
  *H04W 28/02* (2009.01)

(52) U.S. Cl.
  CPC ............ *H04L 47/127* (2013.01); *H04L 47/50* (2013.01); *H04W 28/0205* (2013.01); *H04W 28/0268* (2013.01)

(58) Field of Classification Search
  CPC .................... H04L 47/127; H04W 28/0252
  See application file for complete search history.

(56) References Cited

U.S. PATENT DOCUMENTS

| 7,076,245 | B1 | 7/2006 | Satapathy | |
| 2013/0272121 | A1* | 10/2013 | Stanwood | H04L 47/2475 370/230 |
| 2013/0301559 | A1* | 11/2013 | Zakrzewski | H04W 28/0215 370/329 |
| 2013/0329559 | A1* | 12/2013 | Cabrera | H04W 28/0289 370/235 |
| 2016/0080951 | A1* | 3/2016 | Lindoff | H04W 28/02 455/418 |
| 2017/0026888 | A1* | 1/2017 | Kwan | H04W 36/245 |
| 2018/0020386 | A1* | 1/2018 | Chandramouli | H04W 36/14 |

* cited by examiner

*Primary Examiner* — Jeffrey M Rutkowski
*Assistant Examiner* — Chae S Lee

(57) ABSTRACT

A method and system for improved management of UE service. A base station will predict that its air interface will become threshold highly loaded. And, in response to that prediction but before the predicted threshold high load occurs, the base station will proactively manage service of UEs based on a prediction of how much each UE would suffer from bearer loss if and when the predicted threshold high load occurs. For instance, the base station may predict for each UE a level of service degradation based on service value of each bearer, if any, that the UE would lose if the threshold high load occurs. And the base station may take proactive action, such as triggering a handover and/or providing an alert message, with respect to each UE whose predicted level of service degradation is threshold high.

18 Claims, 4 Drawing Sheets

PROACTIVE RESPONSE TO PREDICTED BEARER LOSS

BACKGROUND

Unless otherwise indicated herein, the description provided in this section is not itself prior art to the claims and is not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure, including one or more gateways and switches, that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

When a cellular wireless network serves UEs, the network may allocate various resources to facilitate communication to and from the UEs. In an example arrangement, for instance, the network may allocate "bearers" that define physical or logical communication channels extending between the UEs and a transport network. Each such bearer may include a radio-bearer component that extends between a UE and a serving base station and an access-bearer component that extends between the serving base station and the transport network. Further, each such bearer may have an associated service level, such as "best effort" or "guaranteed bit rate" for instance, to support a particular quality of service or type of service. In practice, the network may then allocate a number of such bearers for a UE, to support various different types of communication services.

By way of example, when the UE first enters into coverage of a base station, the UE may engage in a registration or "attachment" process that causes the network to allocate for the UE certain default bearers in accordance with the UE's service profile. For instance, if the UE's service profile indicates that the UE supports general packet-data communication (such as web browsing, file transfer, and the like), the network may allocate for the UE a default bearer for carrying such communications with a best-effort service level. Further, if the UE's service profile indicates that the UE supports voice over Internet Protocol (VoIP) communications or other such real-time packet-based communication service, the network may allocate for the UE a default bearer to support Session Initiation Protocol (SIP) signaling or the like to facilitate setup of such communications.

In turn, as a UE is being served by a base station, if the UE is going to engage in another type of communication service, the network may allocate for the UE still other bearers, possibly with other service levels. For instance, if the UE supports VoIP service and seeks to engage in a VoIP call, or a VoIP call server seeks to connect a call to the UE, the network may allocate for the UE a dedicated bearer having a guaranteed bit rate and perhaps other high service level attributes, to carry the VoIP bearer traffic (e.g., packets representing voice), and the UE may then engage in the VoIP call via that bearer. Further, if the UE supports online gaming service and seeks to engage in gaming communication, the network may allocate for the UE a dedicated bearer having a particular service level appropriate for that gaming communication, and the UE may then engage in the gaming via that bearer.

Each bearer that the network allocates to a UE may have an associated quality of service class indicator (QCI) or other indication of the bearer's service level. For instance, a bearer for carrying VoIP bearer traffic may have a QCI of 1, a bearer for carrying SIP signaling or the like may have a QCI of 5, and bearer for carrying best-effort traffic may have a QCI of 8 or 9. When a base station serves a UE, the base station may maintain a context record for the UE, identifying each bearer that the UE has, and specifying the QCI level and/or other attributes of the bearer, for reference by the base station to help ensure appropriate service of the UE.

In a typical cellular wireless network, each of a base station's coverage areas will operate on one or more carrier frequencies and will define various channels for carrying control and bearer data between the base station and the UEs served by the base station. The base station may then manage communication of packet data to and from served UEs over the air interface. For instance, as the base station receives packet data from the network infrastructure for transmission to UEs on various bearers, the base station may queue the data, schedule use of particular downlink air interface resources (e.g., channels, resource blocks, or the like) to carry the data, and transmit the data on the scheduled resources to the destination UEs. Likewise, as UEs have data to transmit on various bearers, the base station may schedule use of particular uplink air interface resources to carry the data, and the UEs may transmit the data on the scheduled uplink resources to the base station.

OVERVIEW

In practice, the air interface over which a base station serves UEs will have a limited capacity to carry control and bearer data to and from served UEs. As a result, there may be times when the air interface becomes so loaded (congested) that the base station cannot serve UEs with sufficient quality of service. For example, if the air interface becomes very loaded, the base station may be unable to meet the throughput requirements for certain guaranteed-bit-rate bearers, and the base station may even be unable to meet a minimum throughput floor requirement for best-effort bearers.

To help manage service of UEs in the face of heavy air interface load, a base station may be configured to monitor the level of load on the air interface and to take remedial action when the load becomes so high that the base station can no longer satisfy certain required or desired levels of service. For example, the base station may be configured to detect when the air interface load becomes threshold high and to responsively release or "drop" certain bearers that are considered less important than others, and perhaps to block establishment of new bearers that would be considered less important than others.

To facilitate this, each bearer that the network allocates to a UE, in addition to having a respective service level such as a QCI level, may have a respective "allocation and retention priority" (ARP) level that defines a priority or importance of the bearer compared with other bearers. Further, each bearer may have an indication of whether the bearer can be preempted, meaning that the bearer can be dropped if necessary. The context record that the base station maintains for UE may thus have a record for each of the UE's bearer(s) indicating the QCI and/or other service level of the bearer, indicating the retention priority level of the bearer, and perhaps further providing a flag indicating whether the bearer can be preempted.

When the base station detects that load on its air interface is so high that the base station is unable to satisfy one or more service level requirements, the base station may responsively drop certain bearers to help overcome the problem. For instance, the base station may identify bearers that have lower retention priority than other bearers, and the base station may drop the identified bearers (and accordingly drop any packets queued for transmission on those dropped bearers), in an effort to free up capacity to facilitate serving more important bearers.

This process of reacting to threshold heavy air interface load, however, could present at least two issues. First, by the time the base station detects that the air interface load has risen to a level where the base station is no longer meeting certain bit rate requirements or other service level requirements, one or more served UEs may have already experienced unacceptably poor user-experience, as packets destined to such UEs may already be delayed. Second, the act of dropping bearers to help overcome a load situation may itself create a user-experience problem, as dropping bearers would prevent UE communication on the dropped bearers. An improvement is therefore desired.

Disclosed herein is a method and system for improved management of UE service. In accordance with the disclosure, a base station will predict that its air interface, on a particular carrier for instance, will become threshold highly loaded. And, in response to that prediction, but before the predicted threshold high load occurs, the base station will proactively manage service of UEs based on a prediction of how much each UE would suffer from bearer loss if and when the predicted threshold high load occurs.

For instance, the base station could evaluate one or more packet queues or other information to detect a trend or other indication that air interface load is approaching a threshold high level at which point the base station would normally drop one or more bearers as noted above. And in response, the base station could then determine for each of its served UEs (i) which if any one or more of the UEs bearer(s) would be dropped if the predicted threshold load occurs and (ii) a representative measure of degradation in service that the UE would experience as a result of such bearer loss if any. The base station may then take proactive action for each such UE whose determined measure of degradation in service is sufficiently high, such as higher than a defined threshold level. For instance, to help proactively deal with the impending high degradation in service to that UE, the base station may direct the UE to hand over to another base station (or to another of the base station's coverage areas) and/or the base station may send to the UE an alert indicating a likely upcoming service degradation.

Accordingly, in one respect, disclosed herein is a method operable in a wireless communication system in which a base station serves a plurality of UEs over an air interface between the base station and the UEs, where each UE has one or more respective bearers with the base station, each bearer has a respective service level, and each bearer has a respective retention priority level that defines a relative importance of the bearer compared with one or more other bearers.

In accordance with the method, the base station predicts that there will be a threshold high level of load on the air interface, for instance, by evaluating trending delays in packet queuing or the like. And responsive to that prediction, the base station then proactively manages service of the UEs, by taking actions including (a) for each UE, predicting by the base station a degradation in service that the UE would experience if the threshold high level of load occurs, where predicting the degradation in service involves predicting the degradation in service based at least in part on one or more attributes of each bearer of the UE, if any, that would be dropped as a result of the threshold high level of load occurring, where the one or more attributes includes at least the service level and/or retention priority level of the bearer, and (b) for each UE whose predicted degradation in service exceeds a threshold level, engaging in service management signaling in response to the UE's predicted loss of service level exceeding the threshold level.

In another respect, disclosed is a base station comprising (i) a wireless communication interface configured for communicating over an air interface and (ii) a controller including a processing unit, data storage, and program instructions stored in the data storage and executable by the processing unit to carry out operations while the base station is serving a plurality of UEs over the air interface. As with the method described above, the base station in this arrangement has one or more bearers for each served UE, each bearer may have a respective service level, and (at least in some implementations) each bearer may also have a respective retention priority level that defines a relative importance of the bearer compared with one or more other bearers.

In accordance with the disclosure, the operations of the base station include predicting, based at least in part on evaluation of operational data, that there will be a threshold high level of load on the air interface. Further, the operations include, responsive to the predicting, proactively managing service of the UEs before the predicted threshold high level of load on the air interface occurs. For instance, the proactive management may include (a) for each UE, predicting a loss of service that the UE would experience if the threshold high level of load occurs, wherein predicting the loss of service includes predicting the loss of service based at least in part on the service level of each bearer of the UE, if any, that would be dropped as a result of the threshold high level of load occurring, and (b) for each UE whose predicted loss of service exceeds a threshold level, engaging in service management in response to the UE's predicted loss of service level exceeding the threshold level.

Still further, disclosed is an example variation of the above method, similarly operable in a wireless communication system as described above. In this example variation, the base station detects that there will be a threshold high level of load on the air interface, and responsive to the detecting, the base station proactively manages service of the UEs at least in part by (a) for each UE, computing by the base station a loss of service level that the UE would experience if the threshold high level of load occurs, wherein computing the loss of service level comprises (i) determining which, if any, of the UE's one or more bearers would be dropped as a result of the threshold high level of load, (ii) computing as the loss of service level a sum of the service levels of the determined bearer(s), (iii) determining for each UE whether the computed loss of service level exceeds a threshold level, and (iv) engaging in service management signaling to each determined UE in response to the determination that the UE's computed loss of service level would exceed the threshold level. Here, the "service level" of a bearer could be based on a QCI of the bearer, a retention priority level of the bearer, and/or one or more other attributes of the bearer.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

As noted above, FIG. 1 is a simplified block diagram of an example network arrangement in which aspects of the present disclosure can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
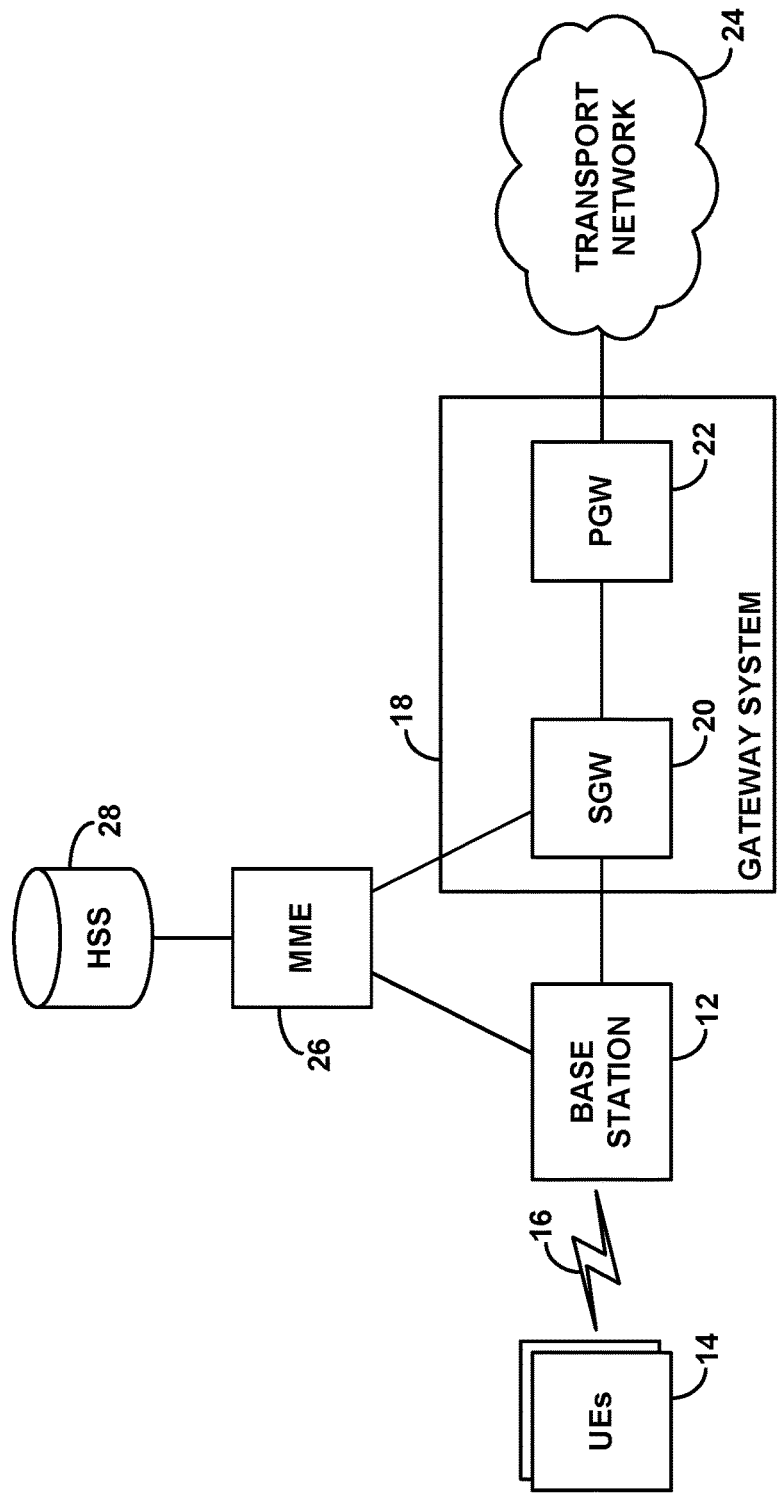
FIG. 1 is a simplified block diagram of a network arrangement in which aspects of the present disclosure can be implemented.

The arrangement of FIG. 1 includes by way of example a representative base station 12 and a plurality of UEs 14 within coverage of the base station 12. The base station and UE may be configured to communicate with each other over a radio frequency air interface 16 according to any of a variety of air interface protocols, examples of which include Orthogonal Frequency Division Multiple Access (OFDMA) (e.g., Long Term Evolution (LTE) or Wireless Interoperability for Microwave Access (WiMAX)), Code Division Multiple Access (CDMA), Global System for Mobile Communications (GSM), and others now known or later developed. For sake of example, and without limitation, the remainder of this disclosure will focus on an LTE implementation.

As illustrated, the example arrangement includes a gateway system 18 comprising a representative serving gateway (SGW) 20 and a representative packet gateway (PGW) 22. The SGW 20 is configured to communicate with the base station 12 and with the PGW 22. And the PGW 22 is then arranged to provide connectivity with a representative transport network 24 such as the Internet or a private packet-switched network for instance. In addition, the arrangement includes a representative MME 26, which functions as a controller for the LTE network and which is configured to communicate with the base station 12 and with the SGW 20. Further, the MME is configured to communicate with a Home Subscriber Server (HSS) 28, which may store account and service profiles for various UEs.

In practice, many of these network components may be owned and/or operated by or for a telecommunications service provider such as a cellular wireless carrier and may physically sit as nodes on a core packet network operated by the service provider. Communications over the various illustrated interfaces may thus pass between various network entities as packet-based communications, such as IP communications for instance, through the core network.

With the example arrangement shown, when each of the UEs 14 enters into coverage of network, the UE may transmit an attach request over the air interface 16 to the base station 12. This attach request may then cause the network to establish for the UE one or more default bearers.

In particular, when the base station 12 receives this initial attach request from the UE, the base station may forward the attach request to the MME 26. The MME may then authenticate and authorize the UE and obtain from HSS 28 an indication of one or more application services to which the UE subscribes and may store an indication of those services in a context record for the UE, keyed to a UE identifier such as an International Mobile Subscriber Identity (IMSI) for instance. For each of various services, the MME may then allocate for the UE a respective bearer ID (e.g., evolved packet system (EPS) bearer ID), which the MME may store in the UE context record in correlation with an identity of the base station for instance. Further, for each such service, the MME then engage in signaling with the SGW 20 and the base station 12 to set up a respective bearer, defining a logical tunnel over which bearer data can flow to and from the UE.

For instance, assuming the UE is authorized for general packet-data service, the MME may engage in signaling with the SGW 20 and the base station 12 to set up for the UE a default bearer to carry general packet-data communication traffic. Further, if the UE is authorized for VoIP service, the MME may also engage in signaling with the SGW and the base station to set up for the UE another default bearer to carry VoIP call setup signaling (e.g., SIP signaling). As discussed above, each of these bearers may have a corresponding level of service, such a QCI level, as discussed above, which might be keyed to a service level agreement of the UE for instance.

The process of establishing each of these or other bearers may take various forms, the particular details of which are not critical. In a representative implementation, for instance, the MME may transmit to the SGW a create-session request, including in the request one or more parameters (e.g., a QCI value and/or an application service level identifier) indicating the service level and/or other type of bearer to be established and identifying the UE at issue (e.g., by IMSI). The SGW may then responsively send a corresponding create-session request to the PGW 22. Upon receipt of the create-session request, the PGW may then query a policy server for authorization to establish the requested bearer for the UE.

With approval, the PGW may then record an access bearer ID for the UE and may work with the SGW to establish a communication tunnel corresponding with the bearer. In particular, the PGW may transmit to the SGW a create-session response indicating the bearer being established (e.g., providing a bearer ID, CQI, UE identifier, etc.) and informing the SGW of an endpoint identifier (e.g., port and/or address) at the PGW to be used for the bearer. The SGW may then transmit an acknowledgement to the PGW, similarly informing the PGW of an endpoint identifier at the SGW to be used for the bearer. In this manner, the PGW and SGW will establish a tunnel for communicating with each other at their respective endpoint identifiers, and each correlate that tunnel with the bearer at issue, including bearer type parameters such as service level for instance.

The SGW may then transmit to the MME a create-session response that provides any applicable service level parameters for the bearer and that informs the MME of an endpoint identifier at the SGW to be used for communication between the SGW and the base station. The MME may then transmit to the base station an attach-accept message, providing any applicable service level parameters for the bearer and informing the base station of the endpoint identifier at the SGW to be used for communication between the SGW and the base station.

Upon receipt of the attach-accept message from the MME, the base station may then transmit over the air interface 16 to the UE a Radio Resource Control (RRC) Connection Reconfiguration message that specifies a radio-bearer ID and any applicable service level parameters, as well as an attach-accept message. The UE may then store the bearer ID and any applicable parameters and send an RRC Connection Reconfiguration Complete message to the base station, indicating setup of the radio-bearer for air interface communication between the UE and the base station.

Further, the base station may transmit to the MME an attach-complete message, and the MME may transmit to the SGW a corresponding attach-complete message that informs the SGW of an endpoint identifier at the base station to be used for communication between the SGW and the base station. In this manner, the base station and SGW will have established a tunnel for communicating with each other at their respective endpoint identifiers, and each would correlate that tunnel with the bearer at issue, including bearer type parameters such as service level for instance.

Through this or another process, a bearer would thus be established for the UE, including a radio-bearer portion that extends over the air interface between the UE and the base station, and an access-bearer that extends between the base station and the SGW and between the SGW and the PGW. Each of the entities involved in communication over this bearer, including the UE, base station, SGW, and PGW for instance, may also maintain service level parameters for the bearer, so as to facilitate treating communications in an appropriate manner, such as with best-effort service level, guaranteed-bit-rate service level, or another service level for instance.

Beyond establishment of one or more default bearers for the UE, the network may also establish for the UE one or more other bearers. As noted above, for instance, if a VoIP call is to be set up for the UE, the network may establish for the UE a dedicated bearer for use to carry the VoIP traffic to and from the UE with an appropriate service level such as a sufficiently high guaranteed bit rate. For example, if the UE engages in SIP signaling with a call server on transport network 24 to set up a VoIP call, signaling may pass to the PGW to trigger setup of a QCI 1 level bearer for carrying the VoIP bearer traffic. The PGW may then engage in signaling with the SGW, which may in turn engage in signaling with the MME, and the MME may engage in signaling like that described above to control setup of the QCI 1 bearer, including setup of the radio bearer portion and access bearer portion. Further, involved network entities such as the base station may update their context records for the UE to indicate that the UE now has this bearer as well.

In line with the discussion above, the coverage of base station 12 may operate on a particular carrier frequency and may define a limited extent of air interface resources for carrying signaling and bearer data between the base station and served UEs. Under LTE, for instance, the air interface may span a particular frequency bandwidth and may be divided over time into a continuum of 1 millisecond transmission time intervals (TTIs), with each TTI defining a specific quantity of physical resource blocks (PRBs) within the frequency bandwidth, with each PRB spanning a set portion of the frequency bandwidth. Each PRB may then be divided into a group of physical resource elements, with the resource elements of the various PRBs in the TTI cooperatively defining a physical shared channel for carrying bearer data (e.g., application-layer user data) between the base station and served UEs. In practice, each resource element in the shared channel can carry a modulation symbol that represents a certain number of bits of data, with the number of bits depending a modulation scheme selected for the UE at issue. With this arrangement, each TTI of the air interface thus defines a limited number of PRBs for carrying a limited extent of data, with the extent varying based on modulation scheme used.

While serving a number of UEs 14, base station may receive from gateway system packets (e.g., IP packets) destined to particular UEs, and the base station may queue those packets for transmission on the air interface to the UEs. In practice, each of these packets may be destined to an Internet Protocol (IP) address of the destination UE and may be marked in a header with a Differential Services Point Code (DSCP) value indicating the QCI level of the packet or otherwise indicating which bearer of the UE the packet is being transmitted on. As the base station receives these packets, the base station may store the packets in one or more logical queues awaiting transmission on the air interface. For instance, the base station may maintain a separate queue for each of a UE's bearers, and these bearer-specific queues may then feed into an air interface scheduling queue from which the base station outputs packets as modulated data on the air interface.

The base station may then apply a scheduling process to manage allocation of air interface resources for carrying packet data to UEs. This scheduling could take various forms. By way of example, the base station could generally apply round-robin scheduling among all of its served UEs, but the base station could apply higher scheduling weights to higher service level (lower QCI number) bearers, so that a greater extent of packets from those bearers get transmitted per unit time than packets from lower service level (higher QCI number) bearers. Further, other scheduling factors, such as proportional fairness and the like, could be taken into account as well. Ultimately, the base station may thus determine on a per TTI basis which packets will be transmitted, and the base station may accordingly engage in the transmission of those packets accordingly.

Given the limited capacity of the base station's air interface, as load on the air interface becomes sufficiently high, it is possible that some packets may be queued longer than desired at the base station. For instance, packets to be transmitted on a guaranteed-bit-rate bearer such as a QCI 1 bearer could be queued so long that the guaranteed bit rate may not be met. Further, as noted above, packets to be transmitted on a best-effort bearer such as a QCI 9 bearer could be queued so long that even a minimum best-effort bit rate may not be met.

As noted above, the base station may be configured to detect the occurrence of such threshold high air interface load and respond by dropping certain bearers deemed to be less important, so as to allow for better service of bearers deemed to be more important.

In practice, for instance, the base station may regularly monitor the load on its air interface in various ways, to detect when load reaches a level where the base station should drop some bearers. As a key question here is when load is high enough that it would likely prevent the base station from meeting certain service level requirements, a good way for the base station to monitor the level of air interface load is for the base station to evaluate downlink packet queuing. For instance, the base station can regularly evaluate how long packets of particular bearers (e.g., of particular service levels) are being queued before transmission on the air interface, and the base station may thus regularly maintain metrics indicating the extent to which packets are being queued for too long. The base station may be configured to detect a statistical high extent (e.g., threshold high rate) of such excess packet delay and to deem that high extent to indicate that load is so high that the base station should drop some bearers to help overcome the problem.

Having decided that the base station will now drop some bearers in view of the high air interface load, the base station may then determine which bearers to drop. This process may also take various forms. By way of example, the base station may be programmed to drop all bearers having a relatively low retention priority level (provided the bearers' are designated as being subject to pre-emption, for instance), and so the base station may determine which bearers have such a low retention priority level and may drop each such bearer. Alternatively, the base station may be programmed to drop each bearer of a UE that has a lower retention priority level than at least one other bearer of the UE, and so the base station may determine for each UE which if any one or more such bearers to drop and may drop each determined bearer. Still further, the base station may be programmed to drop certain bearers in response to one or more associated bearers being dropped. For instance, if the base station drops a SIP signaling bearer of a UE, then the base station may responsively also drop a VoIP bearer of the UE, on grounds that the VoIP bearer is logically grouped with the SIP signaling bearer. Still further, the base station may take into account other factors, such as service level (e.g., QCI) or the like, in deciding which bearers to drop.

Having then decided which bearers to drop, the base station may then drop each such bearer. For instance, the base station may transmit to the UE at issue and to the MME a delete-bearer message to trigger teardown of the bearer and its associated tunnels, and the base station may delete the bearer from the context record that the base station maintains for the UE. Alternatively, if the base station thereby decides to delete all of a UE's bearers, the base station could engage in signaling to detach the UE altogether. In any event, dropping a bearer may involve releasing one or more network resources (e.g., context records, port reservations, etc.) that contribute to defining the bearers.

As noted above, the present disclosure provides for better managing UE service based on a prediction of bearer loss. In particular, as indicated above, according to the disclosure, the base station may predict that air interface load will become threshold high, and then, before the predicted high air interface load occurs, the base station may proactively manage service of the UEs, optimally to help avoid the user-experience issues noted above. Specifically, the base station may then predict for each of its served UEs an extent of service degradation that the UE will experience as a result of bearer loss due to the high load condition, and the base station may then take proactive remedial action, such as handing over the UE to other coverage and/or alerting the UE about the coming service degradation.

Figure 2:
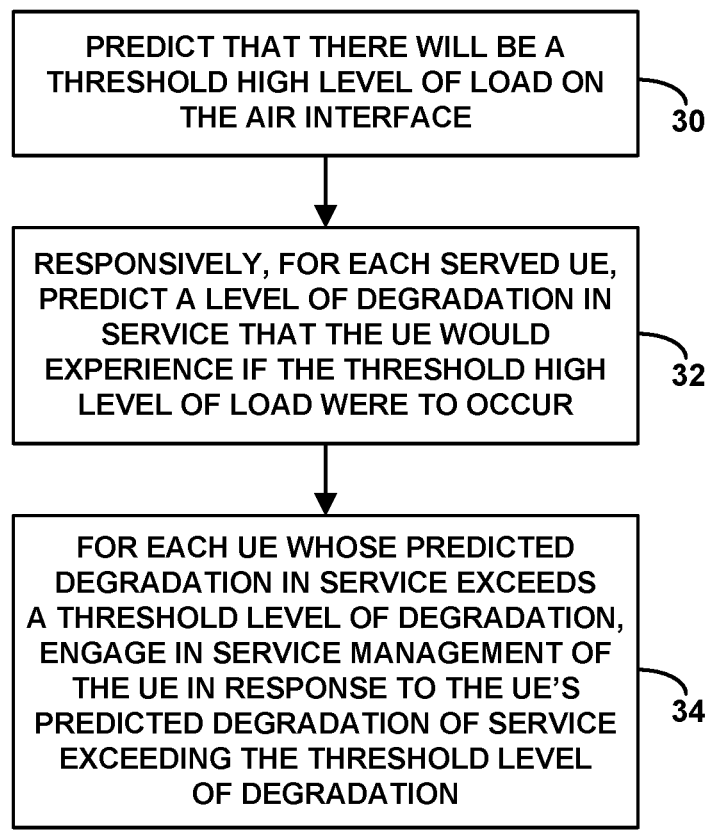
FIG. 2 is a flow chart depicting functions that can be carried out in accordance with the disclosure.

FIG. 2 is a flow chart depicting an example method, to help explain how this can work in practice. This method could be carried out by or for a base station such as base station 12 in a wireless communication system such as that described above. As such, the base station would serve a plurality of UEs over an air interface between the base station and the UEs, each UE would have one or more respective bearers with the base station, each bearer would have a respective service level, and each bearer would have a respective retention priority level that defines a relative importance of the bearer compared with one or more other bearers. These service levels and retention priority levels, along with any other attributes of each bearer, could be established at the time the bearer is established and could be designated in a UE context record maintained by the base station.

As shown in FIG. 2, at block 30, the base station predicts that there will be a threshold high level of load on the air interface. The idea here is to predict this load condition before it actually happens, so that the base station can proactively take action to help manage UE service before the base station gets to the point where the base station will responsively drop bearers. To do this, for instance, the base station may regularly monitor air interface load as discussed above, and the base station may detect that the load is increasing at a sufficient rate and trending toward a threshold point where the base station would responsively drop bearers. More particularly, the base station could periodically record measures of air interface load, and the base station could regularly evaluate change in the air interface load and thus detect that the load is approaching a bearer-drop point.

The base station's evaluation of air interface load could be similar to the evaluation discussed above, though the base station could be programmatically looking for data that indicates load is trending to the bearer-drop point. For example, the base station could evaluate downlink packet queuing, looking for a situation where packets are held for some high percentage of the hold-time that would be considered too long. For instance, if the maximum time that a packet of a particular service level could be held in queue and still satisfy the service level is T milliseconds, the base station could detect that packets of that service level are being held for a duration that is 80% of T, that packets are then being held for 85% of T, and so forth, trending toward packets being held for time T. Alternatively or additionally, the base station might evaluate queue length and determine that the length of the queue is trending higher and higher, toward a point that is likely to pose an issue. Further, the base station could conduct such analysis cumulatively for all of the served UEs, or on average per UE and/or per bearer for instance.

In response to predicting that there will be a threshold high level of load on the air interface, and before that predicted high level of load occurs, the base station then proactively manages service of the UEs. In particular, at block 32, for each UE (e.g., each UE in an RRC connected state), the base station predicts a level of degradation in service that the UE would experience if the threshold high level of load were to occur. And at block 34, for each UE whose predicted degradation in service exceeds a threshold level of degradation, the base station then engages in service management of the UE in response to the UE's predicted degradation of service exceeding the threshold level of degradation. For instance, the base station may direct the UE to hand over to other coverage where the UE may be able to continue operating without experiencing the predicted degradation in service, and/or the base station may send an alert to the UE, perhaps to notify a user of the UE that the UE will soon experience a degradation in service.

In this process, the base station may predict the level of degradation in service based at least in part on one or more attributes respectively of each bearer of the UE, if any, that would be dropped as a result of the threshold high level of load occurring, where the one or more attributes includes at least the service level (e.g., QCI value) of the bearer and/or the retention priority level of the bearer. Making this prediction of degradation in service could take various forms.

For example, of the UE's one or more bearers, the base station could first determine a set of zero or more bearers that would each be dropped as a result of the threshold high level of load occurring. That is, the base station could determine which if any of the UE's bearers would be dropped. Here, the analysis can also be similar to that discussed above. For instance, the base station could determine that a bearer would be dropped if its retention priority level is lower than that of another of the UE's bearers, or if another associated bearer would be dropped, provided the bearer is subject to pre-emption. As a specific example, if a UE has three bearers with progressively lower retention priority levels, the base station could decide to drop the two lower retention priority level bearers on grounds that they are lower retention priority level than the other bearer. And as another specific example, if a UE has a QCI 1 bearer and a QCI 5 bearer and the base station decides to drop the QCI 5 bearer (possibly due to its retention priority level being lower than another bearer), then the base station may also decide to drop the QCI 1 bearer based on it being logically grouped with the QCI 5 bearer.

For certain UEs, the determined set could be zero bearers, meaning that the base station deems no bearer of the UE would be dropped as a result of the threshold high level of load occurring. This may be due to the UE having only very high retention priority bearers or having bearers marked as not being subject to pre-emption, for instance. Further, for certain UEs, the determined set could be just a partial (proper) subset of the UE's bearers. And for still other UEs, the determined set could be all of the UE's bearers.

For each such UE, the base station could then predict the degradation in service that the UE would suffer, by computing a score for the UE based at least in part on a perceived value of the bearer(s) if any in the determined set of zero or more bearers that would each be dropped as a result of the threshold high level of load occurring. In particular the base station could predict the degradation in service that the UE would suffer, based on a consideration of the one or more attributes respectively of each bearer, if any, of the determined set. If the determine set is empty, then the score could be zero. Whereas, if the determined set includes one or more bearers, the base station could compute the score based on the one or more attributes of the bearer(s) in the determined set.

One example way to carry out this analysis is to assign a perceived-value score respectively to each bearer in the determined set based on the QCI and/or retention priority (or other such attributes) of the bearer. To the extent lower QCI and/or retention priority numbers may represent higher priority or greater importance of a bearer, the base station could map lower QCI and/or retention priority numbers to higher scores, and the base station could map higher QCI and/or retention priority numbers to lower scores. The base station could then determine as the perceived-value score of each bearer the bearer's QCI score, the bearer's retention priority score, a total of those scores, or some other similar representation of the perceived value of the bearer. In turn, the base station could then total or otherwise combine together the perceived-value scores of the bearer(s) in the determined set, to produce a representative degradation in service score for the UE.

Once the base station has predicted the degradation in service per UE, still before the predicted load problem occurs and thus before each UE experiences the predicted degradation in service, the base station may then identify each UE whose predicted degradation in service exceeds a threshold. The threshold here can be any threshold that is deemed to be a problematic degradation in service. For example, if loss of a certain quantity of bearers having particular QCI and/or retention priority levels would be deemed a problematic degradation in service, the threshold could be set to a level such that the predicted degradation in service for loss of such bearers would meet that threshold. And the base station may be programmed accordingly.

Having identified one or more UEs whose predicted degradation in service exceeds the threshold, the base station may then take action to manage service of the UE. As noted above, for instance, the base station could engage in service management signaling to the UE. For example, the base station could transmit to the UE a directive for the UE to hand over to another coverage area, or perhaps a directive for the UE to begin scanning for possible handover. Alternatively or additionally, the base station could transmit to the UE an alert message, such as an text message for presentation to a user (if any) of the UE, indicating the possible upcoming degradation in service. And still alternatively or additionally, the base station could begin adding to packets transmitted to or from the UE one or more explicit congestion notification (ECN) bits, as an indication of the load situation. Other example service management actions are possible as well.

Figure 3:
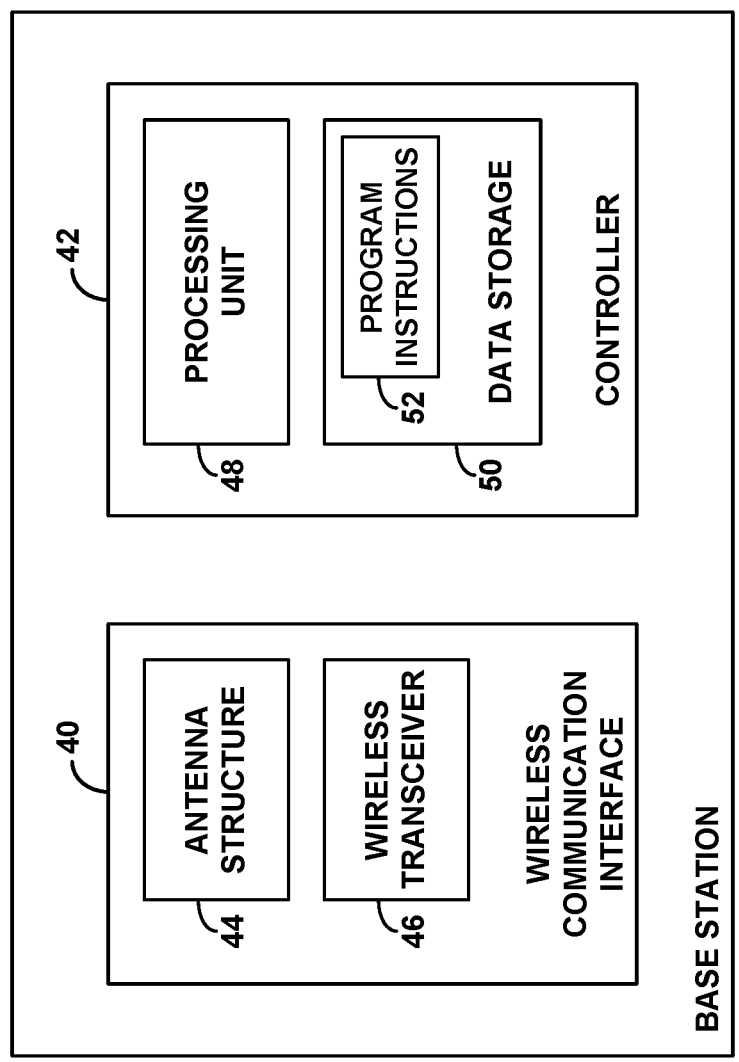
FIG. 3 is a simplified block diagram of a base station operable in accordance with the disclosure.

FIG. 3 is next a simplified block diagram of an example base station operable in accordance with the present disclosure. This base station could generally take any of a variety of forms, including, for instance, a macro base station, a small cell base station, a relay base station, a femto base station, or the like. As shown, the example base station includes a wireless communication interface 40 and a controller 42.

The wireless communication interface 40 may include an antenna structure 44 and wireless transceiver 46 and is configured for communicating over an air interface as discussed above. And the controller may comprise a processing unit (e.g., one or more microprocessors or other types of processors) 48, data storage (e.g., one or more volatile and/or non-volatile non-transitory storage components, such as optical, magnetic, or flash storage) 50, and program instructions 52 stored in the data storage and executable by the processing unit to carry out operations such as those discussed above while the base station is serving a plurality of UEs over the air interface. In practice, for each UE, the base station would have one or more bearers each having a respective service level and each having a respective retention priority level that defines a relative importance of the bearer compared with one or more other bearers.

In line with the discussion above, the base station may thus operate to predict, based at least in part on evaluation of operational data (e.g., based on evaluation of downlink packet queuing), that there will be a threshold high level of load on the air interface. Further, the base station may then operate, responsive to that predicting, to proactively manage service of the UEs before the predicted threshold high level of load on the air interface occurs (whether or not it does ultimately occur). And as discussed above, this proactive service management can involve (a) for each UE, predicting a loss of service that the UE would experience if the threshold high level of load occurs, wherein predicting the loss of service comprises predicting the loss of service based at least in part on the service level of each bearer of the UE, if any, that would be dropped as a result of the threshold high level of load occurring, and (b) for each UE whose predicted loss of service exceeds a threshold level, engaging in service management in response to the UE's predicted loss of service exceeding the threshold level.

Figure 4:
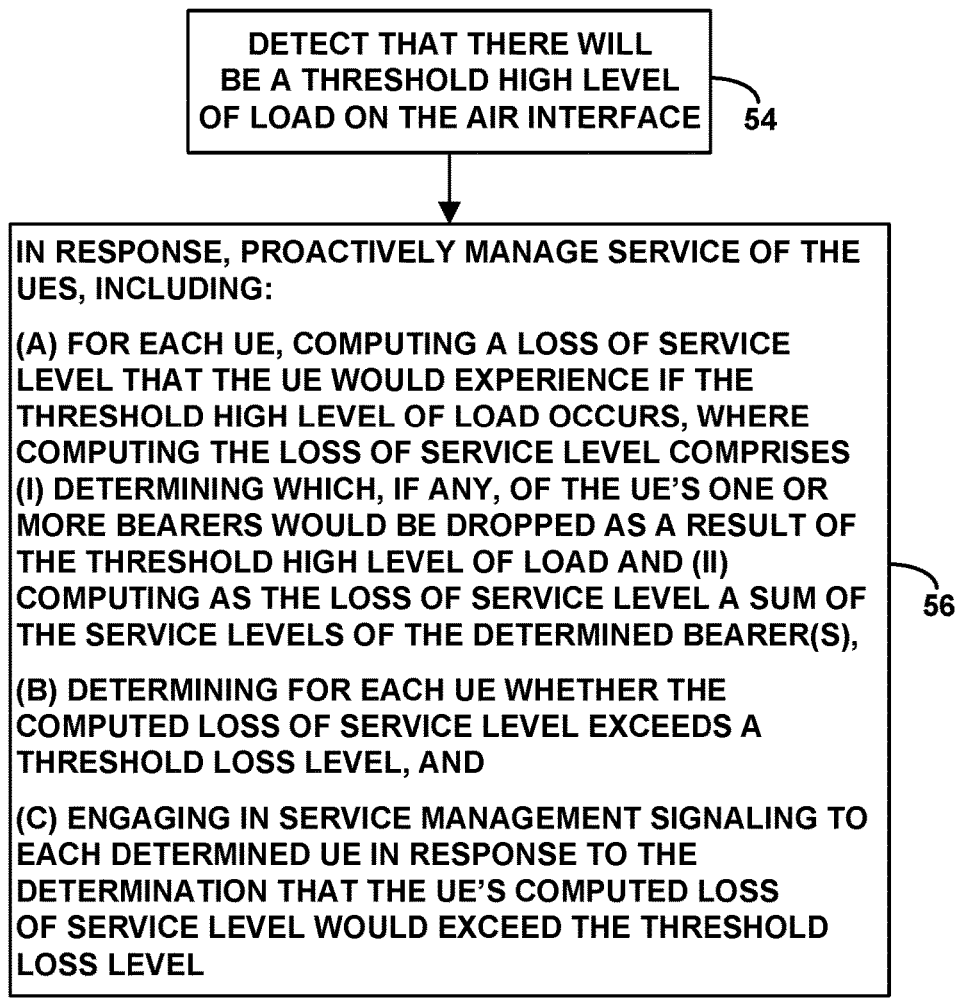
FIG. 4 is another flow chart depicting functions that can be carried out in accordance with the disclosure.

Finally, FIG. 4 is another flow chart depicting an example method to help manage UE service. As with the discussion above, the method here can be carried out by or for a base station or otherwise in connection with a wireless communication system in which a base station serves a plurality of UEs over an air interface between the base station and the UEs. Further, here as in the above discussion, each UE would have one or more respective bearers with the base station, each bearer would have a respective service level, and each bearer would have a respective retention priority level that defines a relative importance of the bearer compared with one or more other bearers.

As shown in FIG. 4, at block 54, the base station detects that there will be a threshold high level of load on the air interface. And at block 56, in response to the detecting, the base station then proactively manages service of the UEs, including: (A) for each UE, computing a loss of service level that the UE would experience if the threshold high level of load occurs, where computing the loss of service level comprises (i) determining which, if any, of the UE's one or more bearers would be dropped as a result of the threshold high level of load and (ii) computing as the loss of service level a sum of the service levels of the determined bearer(s), (B) determining for each UE whether the computed loss of service level exceeds a threshold loss level, and (C) engaging in service management signaling to each determined UE in response to the determination that the UE's computed loss of service level would exceed the threshold loss level.

Exemplary embodiments have been described above. Those skilled in the art will understand, however, that changes and modifications may be made to these embodiments without departing from the true scope and spirit of the invention.

We claim:

1. In a wireless communication system in which a base station serves a plurality of user equipment devices (UEs) over an air interface between the base station and the UEs, wherein each UE has one or more respective bearers with the base station, each bearer having a respective service level and each bearer having a respective retention priority level that defines a relative importance of the bearer compared with one or more other bearers, a method comprising:

predicting by the base station that there will be a threshold high level of load on the air interface; and responsive to the predicting, proactively managing service of the UEs before the predicted threshold high level of load on the air interface occurs, wherein proactively managing service of the UEs comprises:

(a) for each UE, predicting by the base station a degradation in service that the UE would experience if the threshold high level of load occurs, wherein predicting the degradation in service comprises predicting the degradation in service based at least in part on one or more attributes respectively of each bearer of the UE, if any, that would be dropped as result of the threshold high level of load occurring, wherein one or more attributes includes at least one attribute selected from the group consisting of the service level of the bearer and the retention priority level of the bearer, and (b) for each UE whose predicted degradation in service exceeds a threshold level of degradation, engaging in service management of the UE in response to the UE's predicted degradation in service exceeding the threshold level, wherein engaging in service management of each UE whose predicted degradation in service exceeds the threshold level of degradation comprises identifying each UE whose predicted degradation in service exceeds the threshold level of degradation and engaging in service management signaling to each identified UE, and wherein engaging in service management signaling to at least one identified UE comprises directing the at least one identified UE to hand over.

2. The method of claim 1, wherein predicting that there will be the threshold high level of load on the air interface is based on evaluation of downlink packet queuing at the base station.

3. The method of claim 1, wherein predicting that there will be the threshold high level of load on the air interface is based on evaluation of how long downlink packets have been queued for transmission on the air interface.

4. The method of claim 1, wherein predicting the degradation in service based at least in part on the one or more attributes, respectively, of each bearer of the UE, if any, that would be dropped as a result of the threshold high level of load occurring comprises:

of the UE's one or more bearers, determining a set of zero or more bearers that would each be dropped as a result of the threshold high level of load occurring; and predicting the degradation in service based at least in part on the one or more attributes respectively of each bearer, if any, of the determined set.

5. The method of claim 4, wherein determining for each UE the set of zero or more bearers that would be dropped as a result of the threshold high level of load occurring comprises:

determining that a bearer of the UE has a retention priority level lower than the retention priority level of another bearer of the UE; and determining that the bearer would be dropped at least because the bearer has the lower retention priority level than the retention priority level of the other bearer of the UE.

6. The method of claim 4, wherein determining for each UE the set of zero or more bearers that would be dropped as a result of the threshold high level of load occurring comprises:

determining that a bearer of the UE would be dropped because the bearer is associated with another bearer of the UE that would be dropped.

7. The method of claim 4, wherein predicting the degradation in service based at least in part on the one or more attributes of each bearer, if any, of the determined set comprises:

computing a total degradation in service for the determined set.

8. The method of claim 1, wherein the service level of each bearer is represented by a respective Quality of Service Class Indicator (QCI) value, and wherein the one or more attributes comprises the QCI value.

9. The method of claim 1, wherein engaging in service management signaling to each identified UE comprises an operation selected from the group consisting of:
    directing the UE to hand over, and
    sending an alert to the UE.

10. The method of claim 1, wherein engaging in service management of each UE whose predicted degradation in service exceeds the threshold level comprises adding one or more explicit congestion notification (ECN) bits to packet data being communicated to or from the UE.

11. The method claim 1, wherein dropping a bearer comprises releasing one or more network resources that define the bearer.

12. A base station comprising:
    a wireless communication interface configured for communicating over an air interface; and
    a controller comprising a processing unit, data storage, and program instructions stored in the data storage and executable by the processing unit to carry out operations while the base station is serving a plurality of user equipment devices (UEs) over the air interface, wherein, for each UE, the base station has one or more bearers each having a respective service level and each having a respective retention priority level that defines a relative importance of the bearer compared with one or more other bearers, the operations comprising:
    predicting, based at least in part on evaluation of operational data, that there will be a threshold high level of load on the air interface; and
    responsive to the predicting, proactively managing service of the UEs before the predicted threshold high level of load on the air interface occurs, wherein proactively managing service of the UEs comprises:
        (a) for each UE, predicting a loss of service that the UE would experience if the threshold high level of load occurs, wherein predicting the loss of service comprises predicting the loss of service based at least in part on the service level of each bearer of the UE, if any, that would be dropped as a result of the threshold high level of load occurring, and
        (b) for each UE whose predicted loss of service exceeds a threshold loss level, engaging in service management in response to the UE's predicted loss of service exceeding the threshold loss level,
    wherein engaging in service management of each UE whose predicted loss of service exceeds the threshold loss level comprises identifying each UE whose predicted loss of service exceeds the threshold loss level and engaging in service management signaling to each identified UE, and
    wherein engaging in service management signaling to at least one identified UE comprises directing the at least one identified UE to hand over.

13. The base station of claim 12, wherein predicting that there will be the threshold high level of load on the air interface is based on evaluation of downlink packet queuing at the base station.

14. The base station of claim 12, wherein predicting the loss of service based at least in part on the service level of each bearer of the UE, if any, that would be dropped as a result of the threshold high level of load occurring comprises:
    of the one or more bearers that the base station has with the UE, determining a set of zero or more bearers that would each be dropped as a result of the threshold high level of load occurring; and
    predicting the loss of service based at least in part on the service level of each bearer, if any, of the determined set.

15. The base station of claim 14, wherein determining for each UE the set of zero or more bearers that would be dropped as a result of the threshold high level of load occurring is based on at least an evaluation of the retention priority level of a bearer that the base station has with the UE.

16. The base station of claim 14, wherein predicting the loss of service based at least in part on the service level of each bearer, if any, of the determined set comprises:
    predicting the loss of service level based at least in part on (i) the service level of each bearer, if any, of the determined set and (ii) the retention priority level of each bearer, if any, of the determined set.

17. The base station of claim 12, wherein engaging in service management for each UE whose predicted loss of service exceeds the threshold loss level comprises at least one operation selected from the group consisting of (i) directing the UE to hand over, (ii) alerting the UE, and (iii) adding one or more explicit congestion notification (ECN) bits to packet data being communicated to or from the UE.

18. In a wireless communication system in which a base station serves a plurality of user equipment devices (UEs) over an air interface between the base station and the UEs, wherein each UE has one or more respective bearers with the base station, each bearer having a respective service level and each bearer having a respective retention priority level that defines a relative importance of the bearer compared with one or more other bearers, a method comprising:
    detecting by the base station that there will be a threshold high level of load on the air interface; and
    responsive to the detecting, proactively managing service of the UEs, wherein proactively managing service of the UEs comprises:
        (A) for each UE, computing by the base station a loss of service level that the UE would experience if the threshold high level of load occurs, wherein computing the loss of service level comprises (i) determining which, if any, of the UE's one or more bearers would be dropped as a result of the threshold high level of load and (ii) computing as the loss of service level a sum of the service levels of the determined bearer(s),
        (B) determining for each UE whether the computed loss of service level exceeds a threshold loss level, and
        (C) engaging in service management signaling to each determined UE in response to the determination that the UE's computed loss of service level would exceed the threshold loss level, wherein engaging in service management signaling to at least one determined UE comprises directing the at least one determined UE to hand over.

* * * * *